UNITED STATES PATENT OFFICE.

CHAS. R. M. WALL, OF BROOKLYN, NEW YORK.

IMPROVED PROCESS FOR BREWING MALT LIQUORS.

Specification forming part of Letters Patent No. 45,543, dated December 20, 1864.

*To all whom it may concern:*

Be it known that I, CHAS. R. M. WALL, of Brooklyn, in the county of Kings and State of New York, have invented a new and Improved Process for Brewing Malt Liquors; and I do hereby declare that the following is a full, clear, and exact description of the same.

This process differs from the ordinary process, first, in the manner of treating the malt before grinding; second, in the manner of treating the mash and of boiling the wort or extract of malt after the same has been separated from the malt; third, in the manner of cooling the wort preparatory to introducing the same in the fermenting-tuns and during the fermenting process.

The malt, which usually is employed cold, I prepare by heating to a temperature of about 150° previous to grinding and brewing, and thereby I am enabled to approach the mashing process with water of a much lower degree of heat than must be employed in the ordinary process, and I am also enabled to produce a more uniform heat in the mash and more thorough saccharification of the grain, and to reduce the danger of setting or cooking of the starch previous to its being converted into saccharine matter.

In order to facilitate the saccharification of imperfect malt or raw grain, and to prevent such imperfect portion of malt or grain from setting on the false bottom during the usual time of saccharification, I increase the specific gravity of the mash by the addition of sugar or molasses in the proportion of about forty gallons of molases to fifty bushels of malt. By this addition the saccharine matter contained in the imperfect or raw grain is developed and the result is considerably improved. The wort or extract of malt, after having been run off from the malt, is boiled under a pressure somewhat higher than that of the ordinary atmosphere, or at a temperature of about 220°, and thereby I separate and precipitate effectually all the coagulated or unconverted portion of the extract of malt, and the wort is rendered brilliant; and, furthermore, by thus boiling under pressure the honey of malt is amalgamated more effectually and thoroughly with the liquid than by the ordinary process, and the fragrance of the malt and the preserving and flavoring principles of the hops are preserved. Suitable pipes applied to the still, and leading from its top to the bottom or lower part thereof, serve to return the condensed honey of malt to the liquid in the still.

In order to cool the work when done boiling, and preparatory for its reception in the fermenting-tun, I place it under a stratum of cold air or carbonic-acid gas, or both together, in such a manner that the lighter or warmer atmosphere is expelled from the compartments in which the cooling apparatus may be situated, and by these means the loss of carbonic acid is prevented and the brilliancy and keeping qualities of the beer are preserved.

During the fermenting or cleansing process of the ale up to the finishing end of the process, preparatory to its being bunged down or vatted, I place the liquid in such a position as to exclude the external light and warm atmospheric air from coming in close contact with its surface, by having a stratum of cold air, which may be intermingled with the carbonic-acid gas arising from the liquid at a sufficient depth to prevent the excessive escape of carbonic acid and alcohol which may be formed in fermentation. I am thereby enabled to generate sufficient heat in the fluids so working as to produce the characteristics of ale without the great loss of carbonic acid and alcohol consequent upon the ordinary process.

I claim as new and desire to secure by Letters Patent—

1. Increasing the specific gravity of the mash by the addition of sugar or molasses in about the proportion specified, for the purposes herein set forth.

2. Boiling the wort or extract of malt under pressure higher than that of the ordinary atmosphere, substantially as and for the purpose described.

CHAS. R. M. WALL.

Witnesses:
WM. F. McNAMARA,
M. M. LIVINGSTON.